G. Anton.
Fan.
Nº 52109     Patented Jan. 16, 1866.
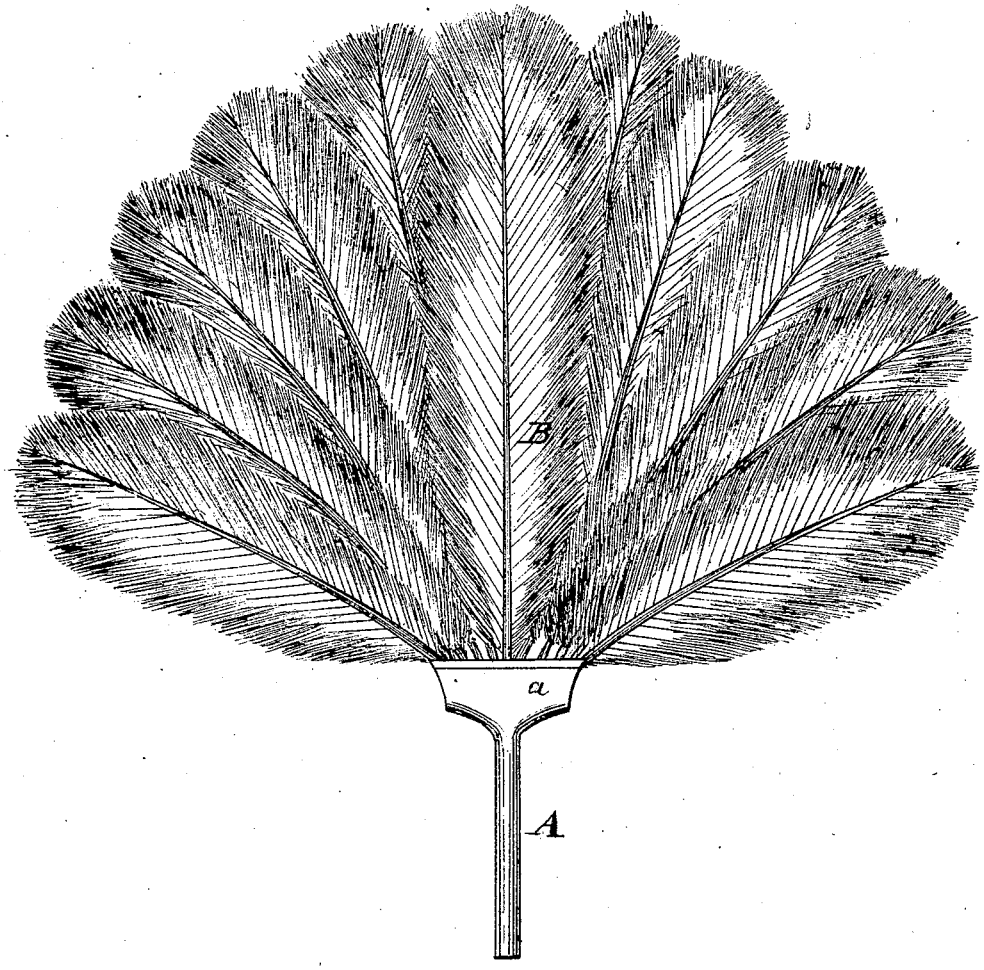
Witnesses.
Wm Albert Steel.
John Parker
Inventor
Gustav Anton
Per H. Howson, Attys

UNITED STATES PATENT OFFICE.

GUSTAV ANTON, OF PHILADELPHIA, PENNSYLVANIA, ASSIGNOR TO HIMSELF, JACOB HIRNER, AND FRAN'S BRURIEN, OF SAME PLACE.

IMPROVEMENT IN FANS.

Specification forming part of Letters Patent No. 52,109, dated January 16, 1866.

*To all whom it may concern:*

Be it known that I, GUSTAV ANTON, of Philadelphia, Pennsylvania, have invented an Improved Fan; and I do hereby declare the following to be a full, clear, and exact description of the same, reference being had to the accompanying drawings, and to the letters and figures marked thereon.

My improved fan consists of a body of feathers secured to a handle of wood or other suitable material, in the manner described hereinafter, the fan being light, efficient, and cheaper than the ordinary palm-leaf fan.

I will now proceed to describe the manner of constructing my invention, reference being had to the accompanying drawings, in which—

Figure 1 is a front view of my improved fan, and Fig. 2 a transverse section.

A represents the handle, and B the body, of the fan, the former being made of wood, bone, ivory, or other suitable material, and the body of the fan consisting of a series of feathers, arranged in the manner illustrated in the drawings. A longitudinal slot is cut in the enlarged portion *a* of the handle, and into this slot the stems of the feathers are inserted and there secured by glue or other suitable cement. A very light and efficient fan may be thus produced, and one much less costly than the heavy palm-leaf fans, as the feathers especially applicable for the purpose are such as are generally thrown away in preparing turkeys and other fowls for the market.

I claim as my invention and desire to secure by Letters Patent as a new article of manufacture—

A fan having a body composed of feathers secured to a handle of wood or other suitable material, in the manner described.

In testimony whereof I have signed my name to this specification in the presence of two subscribing witnesses.

GUSTAV ANTON.

Witnesses:
CHARLES E. FOSTER,
JOHN WHITE.